United States Patent
Borin

(10) Patent No.: US 11,620,446 B1
(45) Date of Patent: Apr. 4, 2023

(54) METHOD AND SYSTEM FOR PACKING SLIP GENERATION

(71) Applicant: GETIDA, LLC, Teaneck, NJ (US)

(72) Inventor: Maksim Borin, Teaneck, NJ (US)

(73) Assignee: GETIDA, LLC, Teaneck, NJ (US)

( * ) Notice: Subject to any disclaimer, the term of this patent is extended or adjusted under 35 U.S.C. 154(b) by 0 days.

(21) Appl. No.: 17/693,471

(22) Filed: Mar. 14, 2022

(51) Int. Cl.
*G06F 17/00* (2019.01)
*G06F 40/186* (2020.01)
*G06F 40/174* (2020.01)
*G06Q 10/083* (2023.01)
*G06Q 10/0875* (2023.01)

(52) U.S. Cl.
CPC .......... *G06F 40/186* (2020.01); *G06F 40/174* (2020.01); *G06Q 10/083* (2013.01); *G06Q 10/0875* (2013.01)

(58) Field of Classification Search
None
See application file for complete search history.

(56) References Cited

U.S. PATENT DOCUMENTS

2003/0229543 A1* 12/2003 Zimmerman ...... G06Q 30/0601
  705/26.1
2018/0336175 A1* 11/2018 Heie ..................... G06F 40/186

* cited by examiner

*Primary Examiner* — Mustafa A Amin
(74) *Attorney, Agent, or Firm* — Bochner IP, PLLC; Andrew D. Bochner

(57) ABSTRACT

The invention of the present disclosure may be a computer system for generating one or more packing slips, the stored program instructions comprising presenting a list of shipments comprising one or more shipments, receiving a selected shipment from the list of shipments, and determining whether a shipment template exists for the selected shipment, creating a packing slip PDF based on the plurality of information, the selected shipment, and the shipment template, determining whether the packing slip PDF contains a first error, evaluating, if the packing slip PDF does not contain the first error, whether the packing slip PDF is to be finalized, determining, if the packing slip PDF is not to be finalized, whether the packing slip PDF contains a second error, and creating, if the packing slip PDF is to be finalized, a finalized packing slip PDF.

8 Claims, 9 Drawing Sheets

Packing Slip Creator Flowchart

| Open requests for Seller DEMOSTORENAME ||
|---|---|
| Shipment | Expiration Date |
| FBA2UBUPFNEO | 05/27/2022 |
| FBA4NMC99WRN | 05/27/2022 |
| FBASQ65S4KVR | 05/27/2022 |
| FBATJO3DOU5J | 05/30/2022 |
| FBA98C6L7MLY | 05/31/2022 |
| FBABLCHU5WQ3 | 05/31/2022 |
| FBAN6CGJ4Y45 | 05/31/2022 |
| FBAAAJ8SD0WT | 05/31/2022 |
| FBAKVF8TGGJJ | 05/31/2022 |
| FBAPLYSGXUG9 | 06/02/2022 |
| FBAH3YHIQCLL | 06/02/2022 |
| FBAOC38R8ML4 | 06/04/2022 |
| FBAYPM59AVJT | 06/04/2022 |
| FBAGR4WOLET3 | 06/04/2022 |
| FBA5DNY6H52H | 06/04/2022 |

FIG. 5

PACKING LIST

Note: Company info mus match Seller account company details.

Company Name

Country
United States

Address Line 1

Address Line 2

City

State
Please Select State

Zip Code

Phone
(321) 456 - 7890

No file chosen, yet!

CHOOSE LOGO

-Logo should be Brand Logo, if multiple brands in same store, use store logo.
- For faster processing limit logo size to .5MB (500 Kb).

Ship From
Company Name
123 Main st
Suite A
New York, NY 10011
US

Ship To:
Fullfilment Center

SELLER ID:  DEMOSELLERID
Shipment Date:  8/10/2021
Shipment ID:  FBA2UBUPFNEO
Shipment Name:  FBA (08/10/21 5:12 PM)
SKU Total:
Unit Total:  960

Shipment Items

| FNSKU | SKU | Product Name | Shipped Quantity | Edit |
|---|---|---|---|---|
| X002Z92457 | BH-92457-2Z | | 960 | edit |

First Name of Authorized Signatory | Last Name of Authorized Signatory
First | Last | Cancel Signature Undo | Clear

CREATE PACKING LIST

FIG. 6

Please review packing slip

■wwuXZfHv6HwJQ...  1/1  –  87%  +

PACKING LIST
My Company
101 Mystreet st
New York, NY 11001
US
+1-321-456-7890

C COMPANY

---

Ship From
Company Name
123 Main st
Suite A
New York, NY 10011
US

Ship To:
Fullfilment Center

SELLER ID: DEMOSELLERID
Shipment Date: 8/10/2021
Shipment ID: FBA2UBUPFNEO
Shipment Name: FBA (08/10/21 5:12 PM)
SKU Total:
Unit Total: 960

Shipment Items

| FNSKU | Seller SKU | Product Name | Shipped Quantity |
|---|---|---|---|
| X002Z92457 | BH-92457-2Z | | 960 |

| Name of Authorized Signatory: | Signature: |
|---|---|
| First Last | Naveen |

Page 1 of 1

[ Yes, everything looks good ]

[ No, go back edit ]

METHOD AND SYSTEM FOR PACKING SLIP GENERATION

FIELD OF INVENTION

The invention is in the field of document generation, specifically methods and systems for generation of packing slips.

INTRODUCTION

Currently, many entrepreneurs and businesspeople utilize large technology platforms for selling their wares. For example, many such individuals sell their goods through platforms that include fulfillment centers or other shipping hubs. Thus, while traditionally many sellers would interact directly with consumers, when utilizing such large platforms, many sellers interact with consumers only indirectly or not at all. Accordingly, such a relationship between sellers and e-commerce platforms has created many unforeseen issues.

Specifically, many sellers who ship their goods to e-commerce hubs or fulfillment centers do not have packing slips for such shipments. This lack of packing slips can cause confusion in sending, shipping, sorting, and receiving of these shipments. Further, lost or late shipments may impact a seller's profit. Moreover, many large retail platforms allow customers to leave reviews or feedback on purchases. Thus, negative reviews pertaining to lost or delayed packages may negatively impact the seller's reputation and business in general.

While a seller may attempt to manually write packing slips, this may be very time consuming, especially for those sellers with high output. Further, manually drafting packing slips may induce a number of typos, mistakes, or other errors.

Thus, it would be desirable to have tools to generate packing slips. Further, it would be desirable to have methods and systems that gather shipment data from third-party e-commerce APIs.

It would be further desirable to have systems and methods that automate the process of packing slip generation. It would be yet further desirable to have a packing slip generation system capable of automatically retrieving updated shipment and item information.

SUMMARY

The invention of the present disclosure may be a computer system for generating one or more packing slips in a remote computing environment comprising one or more processors, one or more computer-readable memories, one or more computer-readable storage devices, one or more displays, and program instructions stored on at least one of the one or more computer-readable storage devices for execution by at least one of the one or more processors via at least one of the one or more computer-readable memories, the stored program instructions comprising presenting a shipment interface, via the one or more displays, comprising a list of shipments comprising one or more shipments, wherein each of the one or more shipments are selectable; receiving, via the shipment interface, a selected shipment from the list of shipments; and determining, via the one or more processors, whether a shipment template exists for the selected shipment. The stored program instructions may further comprise recalling, via a DocMaster database, the shipment template if the shipment template exists for the selected shipment; generating, if the shipment template does not exist for the selected shipment, the shipment template; and receiving, if the shipment template does exist for the selected shipment, a plurality of information. In an embodiment, the stored program instructions comprise presenting a packing slip interface, via the one or more displays, wherein the packing slip interface is interactive such that a user may edit the shipment template, and wherein the packing slip interface is configured to receive additional information; creating, via the one or more processors, a packing slip PDF based on the plurality of information, the selected shipment, the shipment template, and the additional information; presenting a packing slip review interface comprising a proceed option and an edit option, wherein the proceed option and the edit option are selectable; presenting the packing slip interface if the edit option is selected; and storing the packing slip PDF in a file storage if the proceed option is selected.

In an embodiment, the packing slip review interface comprises a rendered packing slip PDF, wherein the rendered packing slip PDF is rendered via session variables and is not permanently stored. In a further embodiment, the stored program instructions further comprise recalling, from an API, the one or more shipments; and processing, via the one or more processors and a shipment processing server, the one or more shipments.

The packing slip interface may comprise item information and an item information edit option configured to enable modification of the item information. The additional information may include a signature input, wherein the signature input is an HTML canvas signature pad. In a further embodiment, the additional information comprises a logo upload configured to accept a logo, wherein the logo is an image file.

In an embodiment, selection of one of the one or more shipments from the shipment interface causes the one of the one or more shipments to be saved in the DocMaster database, and wherein a subsequent selection of the one of the one or more shipments causes the one of the one or more shipments to be recalled from the DocMaster database. The list of shipments may include one or more expiration dates, wherein each of the shipments of the list of shipments correlates to one of the one or more expirations dates, and wherein the list of shipments is sorted chronologically as a function of the one or more expiration dates.

It is to be understood that both the forgoing and the following descriptions are exemplary and explanatory only and are not intended to limit the claimed disclosure or application thereof in any manner whatsoever.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

FIG. 5 is an illustration of a shipment interface.

FIG. 6 is an illustration of a packing list interface.

FIG. 7 is an illustration of a packing list review interface.

DETAILED DESCRIPTION

Figure 1:
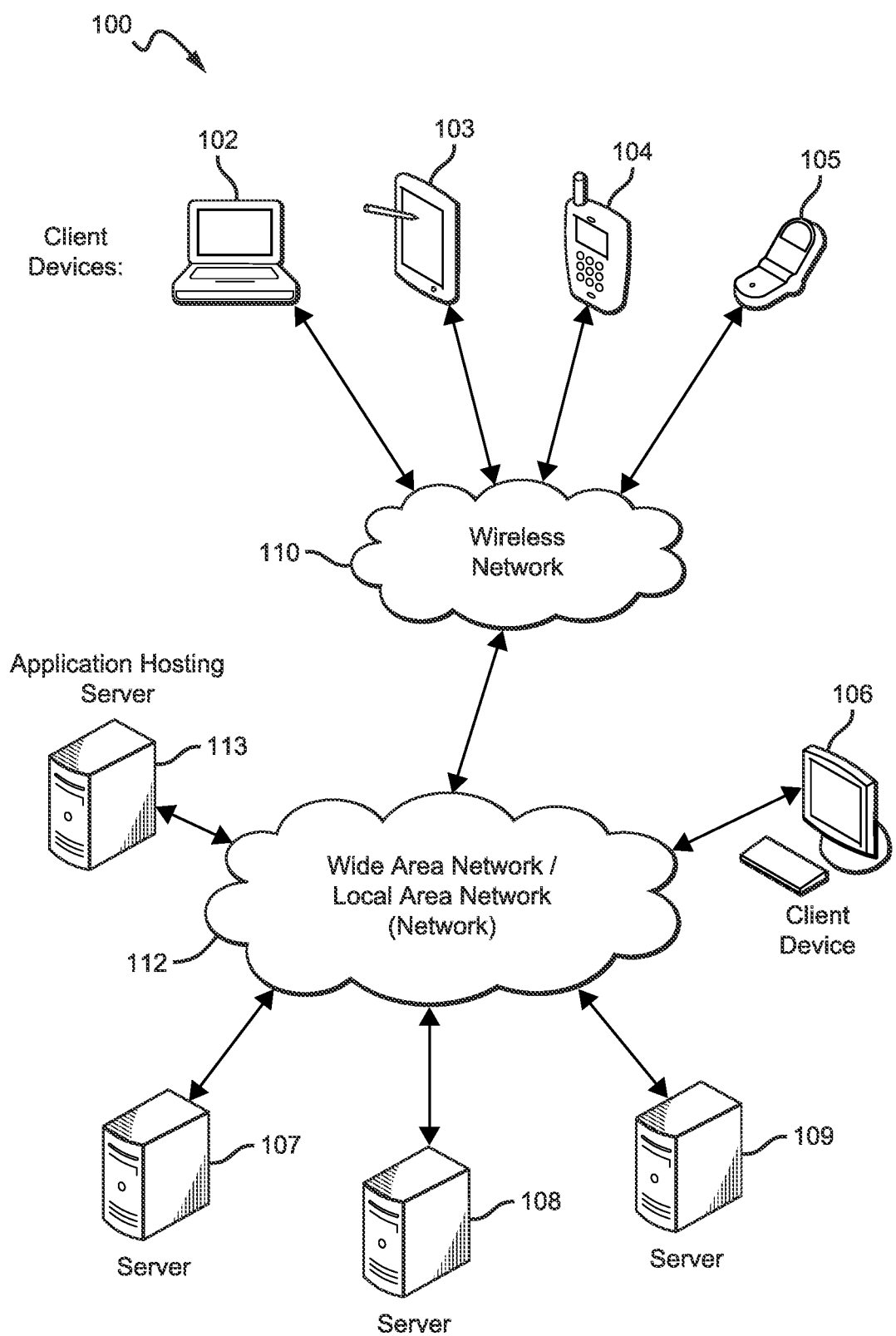
FIG. 1 is an illustrative block diagram of a system based on a computer for execution of a packing slip generation system.

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

The present disclosure relates to a system and method for packing slip generation.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or process the software in a distributive manner by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" as used herein typically includes and refers to executable instructions, code, data, applications, programs, program modules, or the like maintained in an electronic device such as a ROM. The term "software" as used herein typically includes and refers to computer-executable instructions, code, data, applications, programs, program modules, firmware, and the like maintained in or on any form or type of computer-readable media that is configured for storing computer-executable instructions or the like in a manner that may be accessible to a computing device.

The terms "computer-readable medium", "computer-readable media", and the like as used herein and in the claims are limited to referring strictly to one or more statutory apparatus, article of manufacture, or the like that is not a signal or carrier wave per se. Thus, computer-readable media, as the term is used herein, is intended to be and must be interpreted as statutory subject matter.

The term "computing device" as used herein and in the claims is limited to referring strictly to one or more statutory apparatus, article of manufacture, or the like that is not a signal or carrier wave per se, such as computing device 101 that encompasses client devices, mobile devices, wearable devices, one or more servers, network services such as an Internet services or corporate network services based on one or more computers, and the like, and/or any combination thereof. Thus, a computing device, as the term is used herein, is also intended to be and must be interpreted as statutory subject matter.

FIG. 1 illustrates components of one embodiment of an environment in which the invention may be practiced. Not all of the components may be required to practice the invention, and variations in the arrangement and type of the components may be made without departing from the spirit or scope of the invention. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. Various of the client devices 102-106 may include, for example, desktop computers, laptop computers, set top boxes, tablets, cell phones, smart phones, smart speakers, wearable devices (such as the Apple Watch) and the like. The Servers 107-109 can include, for example, one or more application servers, content servers, search servers, and the like. FIG. 1 also illustrates application hosting server 113.

Figure 2:
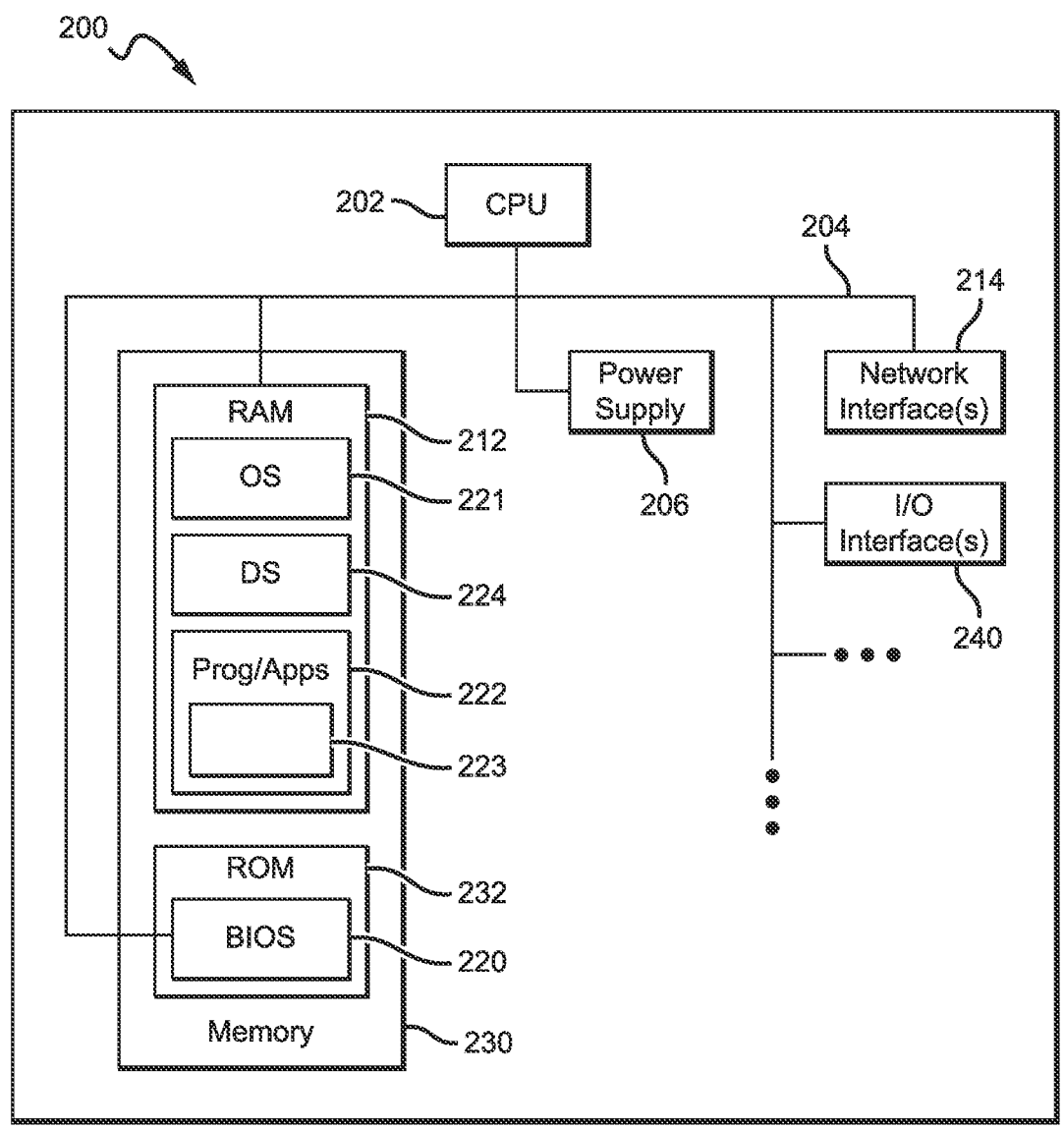
FIG. 2 is an illustration of a computing machine for execution of a packing slip generation system.

FIG. 2 illustrates a block diagram of an electronic device 200 that can implement one or more aspects of an apparatus, system and method for validating and correcting user information (the "Engine") according to one embodiment of the invention. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software and other tools necessary to implement or facilitate methods and systems according to embodiments of the invention. The elements may exist on a single computer or be distributed among multiple computers, servers, devices or entities.

The power supply 206 contains one or more power components, and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server®, Mac OS Unix®, Linux®, FreeBSD®, and the like.

A server may include, for example, a device that is configured, or includes a configuration, to provide data or content via one or more networks to another device, such as in facilitating aspects of an example apparatus, system and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows®, iOS® or Linux®, and mobile operating systems such as iOS®, Android®, Windows Mobile®, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending and receiving messages via email, SMS, or MMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2G), 3rd (3G), 4th (4G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Embodiments of the present invention include apparatuses, systems, and methods implementing the Engine. Embodiments of the present invention may be implemented on one or more of client devices 102-106, which are communicatively coupled to servers including servers 107-109. Moreover, client devices 102-106 may be communicatively (wirelessly or wired) coupled to one another. In particular, software aspects of the Engine may be implemented in the program 223. The program 223 may be implemented on one or more client devices 102-106, one or more servers 107-109, and 113, or a combination of one or more client devices 102-106, and one or more servers 107-109 and 113.

In an embodiment, the system may receive, process, generate and/or store time series data. The system may include an application programming interface (API). The API may include an API subsystem. The API subsystem may allow a data source to access data. The API subsystem may allow a third-party data source to send the data. In one example, the third-party data source may send JavaScript Object Notation ("JSON")-encoded object data. In an embodiment, the object data may be encoded as XML-encoded object data, query parameter encoded object data, or byte-encoded object data.

The invention of the present disclosure may be a system for packing slip generation (referred to herein as the "system"), wherein the system downloads the seller's shipment information (for example, using third party APIs). Thus, the system may generate packing slip templates based on the seller's shipment information. After generation of the partial packing slip, the seller may provide their company information to complete the document. In a further embodiment, the system may be configured to include the seller's signature. The system may convert said information to a Portable Document Format (PDF) document. Once converted to a PDF document, the seller may verify the accuracy of the information in the document. Upon verification by the seller, the PDF may be finalized. Accordingly, a succeeding shipment and corresponding packing slip may be populated with the previous user input, including company name, address, phone number, and authorized signature, making it easier for the seller to generate a volume of packing slips.

Figure 3A:
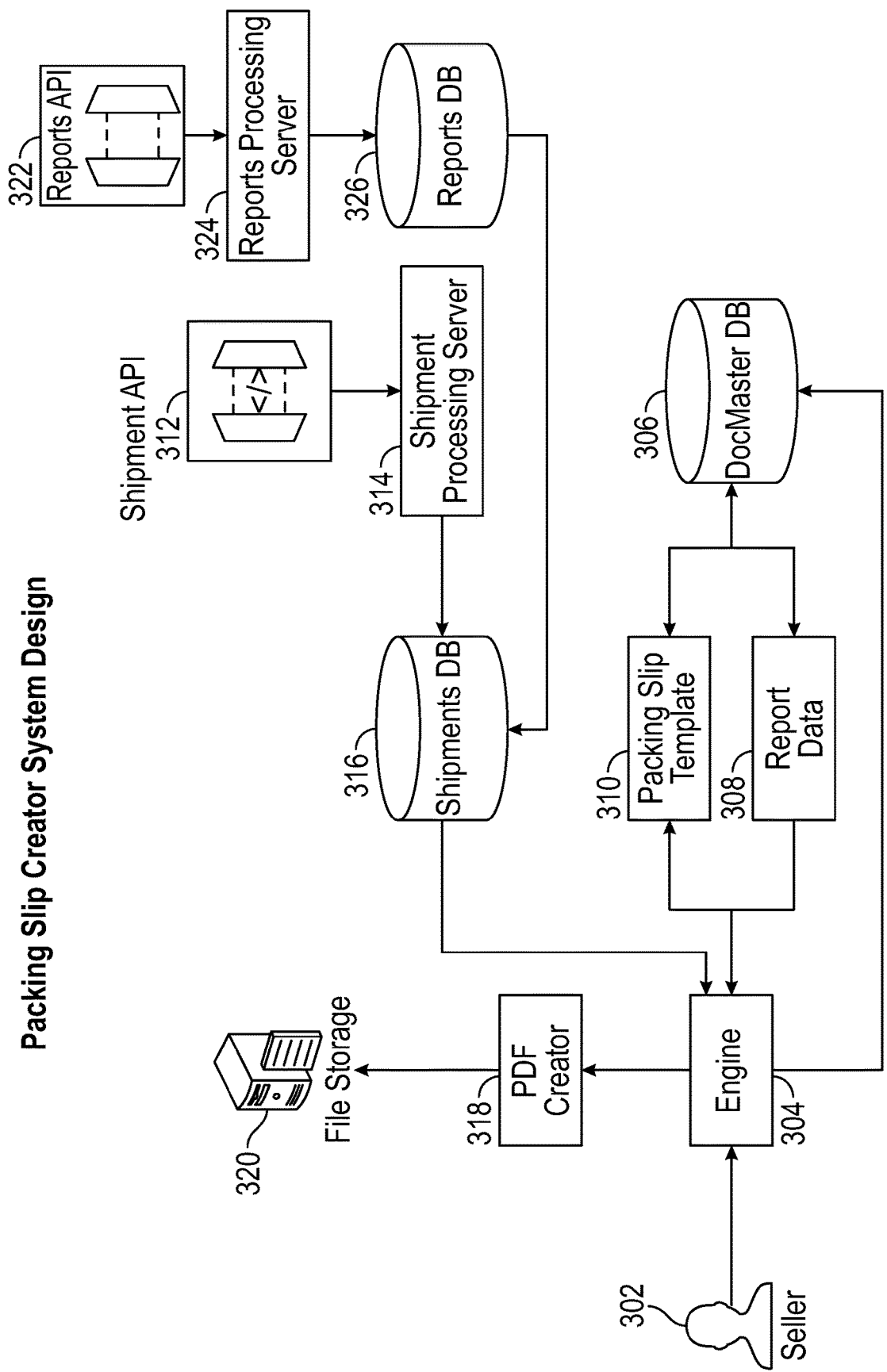
FIG. 3A is an illustration of an embodiment a packing slip generation system.

The system is described in greater detail below with regards to FIG. 3A. FIG. 3A is a flow diagram illustrating operation of the system. As shown in FIG. 3A, the seller 302 interacts with an engine 304. Prior to entering or upon entering the engine 304, the user may be prompted with a login page. The login page may allow the user to enter the engine 304 by entering their pin, username, password, or other identifying information. An administrator may assign the pin to each user. Further, the system, via the engine 304 or prior to the engine 304, may generate and display a list of shipments (described in further detail below as the shipment interface 500). Said list of shipments may comprise all shipments corresponding to the user's account (for example, the user's business' e-commerce account). The engine 304 may be a tool enabling the seller 302 to create, manage, and publish reports. For example, the engine 304 may be accessible via any suitable web browser. However, in another embodiment, the engine 304 and/or other components of the system may be accessible as downloadable programs (for example, executable on a desktop computer). The engine 304 may be in communication with a database, for example, the DocMaster database 306. The DocMaster database 306 may be in communication with report data 308 and a packing slip template 310. The packing slip template 310 may be an HTML page in which the fields are replaceable by report data (for example, the data retrieved from the DocMaster database 306).

In an embodiment, the packing slip template 310 includes a plurality of fields. Each of the fields may correspond to data derived from the shipment API 312. Accordingly, the shipment API 312 may be in communication with a shipment processing server 314. The shipment API 312 may receive information from sellers, the third-party selling platform, and indirectly buyers, and communicate said information to a shipments database 316, via the shipment processing server 314. The shipment processing server 314 may be configured to draw data from the shipment API 312 before the user arrives at the login PIN input interface. In such an embodiment, the shipment processing server 314 may retrieve data from the shipment API 312 upon a user's initial signup. However, the shipment processing server 314 may be configured to retrieve data from the shipment API 312 at predetermined frequencies (for example, every hour, every day, upon a user's PIN entry, or upon creation of a new shipment). After data is processed by the shipment processing server 314, said processed data may be stored in the shipment database 316 until the user selects one of the shipments from the shipment list interface. Upon selection of a shipment, said processed data may be transmitted to the DocMaster database 306. Thus, if a user returns to the shipment interface and selects the same shipments again, the shipment information may be retrieved directly from the DocMaster database 306. Accordingly, this allows the system to be more efficient as the same data must not be re-retrieved and re-processed. Instead, a user may retrieve the desired shipment information, create a template draft, and have said draft saved in the DocMaster database 306 for expedited future retrieval. Further, engine 304 may receive seller, buyer, and shipment information from the shipment database 316 before transmitting said information to the DocMaster database 306, packing slip template 310, and/or report data 308.

Figure 3B:
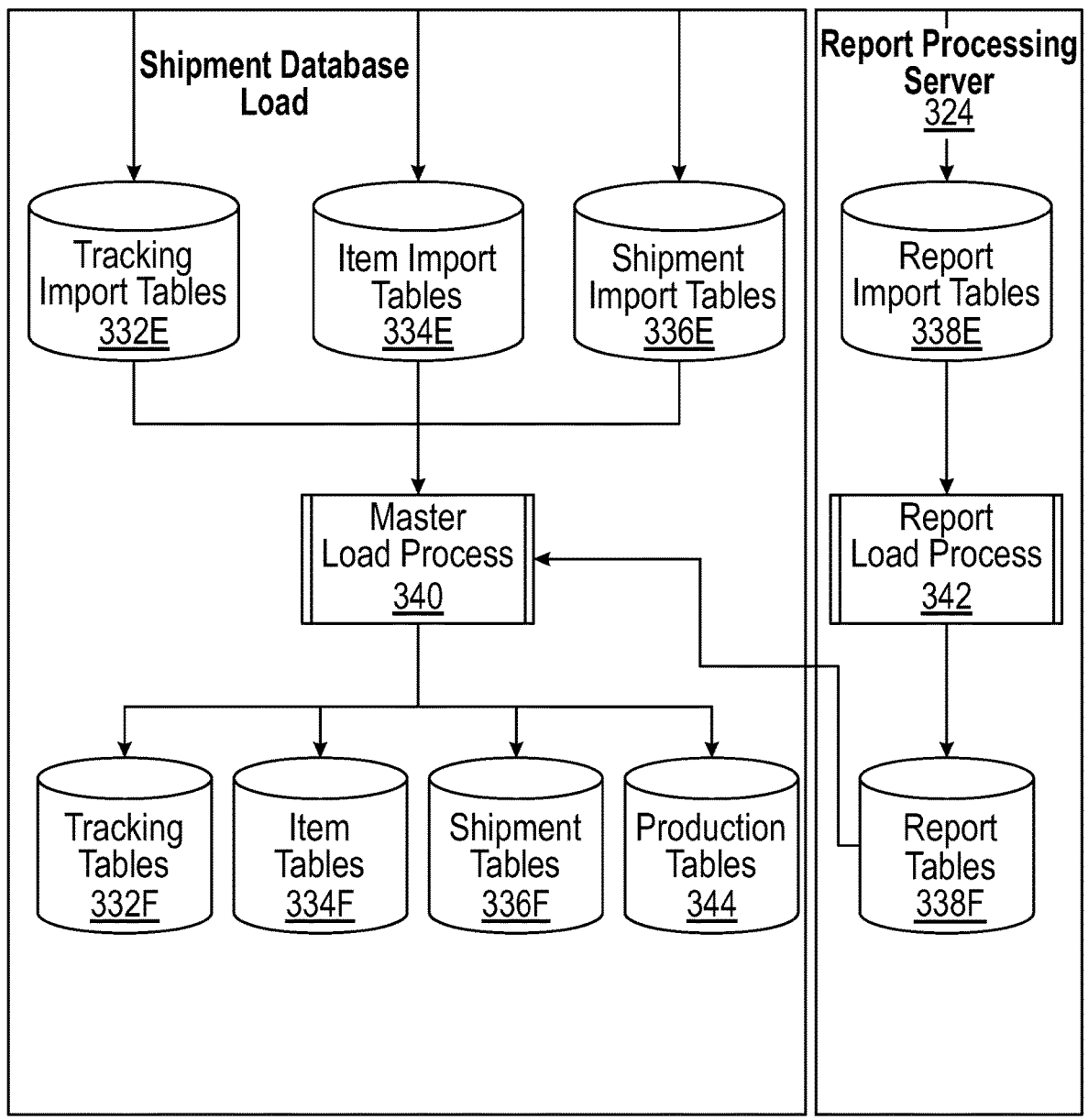
FIG. 3B is an illustration of an embodiment of shipments and reports workflows.
Figure 3B:
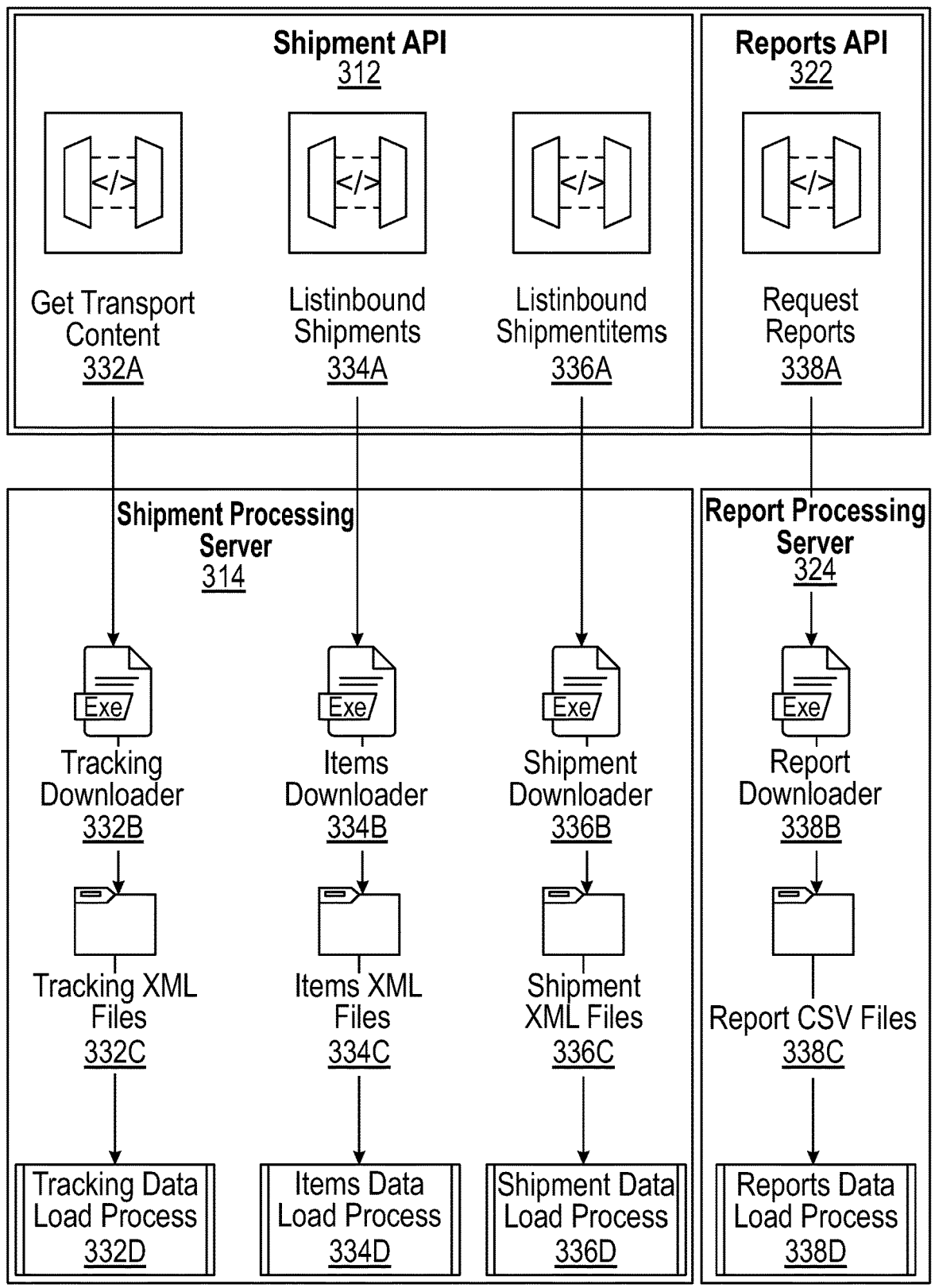

In an embodiment, the shipments database 316 may retrieve data from both a shipment shipment API 312 and a reports API 322. Referring to FIG. 3B, the shipments shipment API 312 may comprise one or more calls, for example, a "gettransportcontent" call 332A, a "listinboundshipments" call 334A, and a "listinboundshipmentitems" 336A. The shipment processing server 314 may comprise one or more executable programs, each of the one or more executable programs configured to correspond to one of the shipments shipment API 312 calls. In one embodiment, the shipment processing server 314 comprises a tracking downloader 332B, an items downloader 334B, and a shipment downloader 336B. Each of the executable programs 332B-336B may be configured to output one or more data sets. For example, as shown in FIG. 3B, the tracking downloader 332B may output a tracking XML file 332C, the items downloader 334B may output an items XML files 334C, and the shipment downloader 336B may output shipment XML files 336C. Further, the shipment processing server 314 may comprise one or more load processes. As shown in FIG. 3B, the shipment processing server 314 may comprise a tracking data load process 332D configured to process the tracking XML files 332C, an items data load process 334D configured to process the items XML files 334C, and a shipment data load process 336D configured to process the shipment XML files 336C. Each of the load processes 332D-336D may be adapted to form tracking import tables 332E, item import tables 334E, and shipment import tables 336E, respectively.

Referring to FIG. 3B, a reports API 322 comprises a request reports call 338A. The report processing server 324 may comprise a report downloader 338B, wherein the report downloader 338B is an executable program that corresponds to the request reports 338A. The report downloader 338B may be configured to extract and build report CSV files 338C. The reports API 322 may comprise a reports data load process 338D configured to output report import tables 338E. Report import tables 338E may be further processed by a report load process 342 into report tables 338F.

The tracking import tables 332E, the item import tables 334E, the shipment import tables 336E, and the report tables 338F may be processed by a master load process 340 into tracking tables 332F, item tables 334F, shipment tables 336F, and production tables 334. In such an embodiment, each of the aforementioned tables 332F/334F/336F/344 may be transmitted and stored in the shipments database 316.

The system may comprise two separate APIs (for example, the shipments shipment API 312 and the reports API 322), wherein each API is correlated to different aspects of shipping and order processing. For example, to populate data one or more calls may be made to one or more APIs. Each of the calls may extract data in any suitable format, for example, XML, CSV, or other data structures. In one embodiment, the shipments shipment API 312 comprises three calls for: item, shipment, and tracking. However, in such an embodiment, certain necessary information may be unavailable in the three shipments shipment API 312 calls. For example, to prepopulate item name, the shipments shipment API 312 calls are insufficient. Thus, such information may be sourced from a different API (for example, the reports API 322). The reports API 322 may be utilized for many other purposes, as well. Specifically, the reports API 322 may be drawn from to gather data pertaining to the item characteristics of the items within each shipment.

In an embodiment, any of the calls may communicate with the shipments database 316 (or other suitable databases) to identify the seller's keys. The seller's keys may be configured to grant permission to any of the APIs. Although the seller's keys may be stored in the shipments database 316, the keys may originate from another server or database. For example, the keys may be extracted from the user or from such servers and databases upon the seller's signup with the system.

Once the XML or CSV files are extracted and/or stored within folders, the load processes may be adapted to seek the necessary data and stored such data in a temporary table in a raw format. In one embodiment, the various downloaders may be stored within the processing servers, while load procedures or processes may be stored within the shipments database 316. However, in various embodiments, any of the procedures or processes may be stored and/or executed in any suitable database or system component. The processing servers may include schedule tasks that are configured to initiate the loading procedures. For example, the schedule tasks may initiate loading at predetermined times, such as once per week or every morning. The master load process 340 may split each of the temporary tables 332E/334E/336E/338F into four tables 332F/334F/336F/344, one for each of the three shipment-specific temporary tables and the report tables. The report tables 338F may include additional fields corresponding to item-specific attributes.

In an embodiment, the import tables include an automatic reset each day. The master load process 340 may archive data via an algorithm that is configured to analyze what data is available in the tables 332F/334F/336F/344 and intelligently merge the new information with the preexisting information (for example, naturalizing the data).

In a further embodiment, the reports database 326 may includes keys which were extracted from the seller upon signup. The keys may originate from the overarching seller platform, for example, the keys may be assigned to the seller by the seller platform.

Sporadically, the overarching seller platform may incorrectly or retroactively populate their records. Accordingly, the data as recalled by the shipment processing server 314 or report processing server 324 may include data dated prior to the call window. For example, the processing servers 314/324 may be configured to pull the last two weeks of data every Monday. In such an example, the seller platform may import shipment or item records several days after the event date. Therefore, the processing servers 314/324 are configured to pull data within a call window that enables capture of out-of-date or improperly entered records.

In various embodiments, the APIs 312/322 may be called upon for various call windows at various intervals. Further, the system may have various call patterns as a function of the type of seller. For example, if a seller is a new seller (one who is new to the packing slip generation system), an initial call may be transmitted to the shipment API 312 with a call window of the past two years. Such a new seller call window may be adjusted according to the breadth of the seller's shipment portfolio. Alternatively, for an existing seller, the call window for the shipment API 312 may begin on the date of the last successful data pull. Additionally, a larger data pull may be configured for every Friday, with a window of roughly 15 days. Such a larger data pull may be designed to capture out-of-date entries or other data abnormalities. Further, there may be yet a larger data pull every one to two months, with a call window of six months. Thus, by performing various temporal windows of data pulls at varying intervals, and by utilizing data naturalization and smart merger, the data within the shipments database 316 may be kept up to date and accurate. As a non-limiting example, the system may be configured to pull data from the reports API 322 daily, regardless of whether the seller is a new or existing seller.

The data load processes, report load processes, and master load processes may be configured for smart merging, wherein the system analyzes what information is currently available in the finalized tables or database versus inbound data. Accordingly, the system may select which data sets may be imported or processed and how such data sets may be sorted, structured, or organized to match the finalized tables and databases. In a further embodiment, the master load procedure may process data from multiple APIs. For example, the master load procedure may be configured to process data from three or four APIs, wherein the additional APIs transmit unique data. In such an example, the additional data from the additional APIs may enrich the data as it appears in the finalized tables or databases.

In an embodiment, when the user enters the input page to create the packing slip, the shipment data is copied from the shipment tables into the packing slip template tables, where then the shipment data is copied to the template tables. Such information may include, but is not limited to, the ship from address; the ship to address (for example, if the seller is supplying a fulfillment center, then the ship to address may include a Fulfillment Center code); a seller identification number (for example, an identification number assigned to the seller by an affiliate or parent organization); a store name (for example, a trade name assigned by the seller); a shipment ID; a shipment name; a SKU total; and a unit total. In an embodiment the list of shipment items include, but are not limited to, the following columns: FNSKU; SKU; product name (for example, editable by the user); and shipped quantity (for example, editable by the user). Moreover, the following input fields may be presented to the user: logo (for example, uploaded as an image file); company name (for example, enterable via a text box); country (for example, selectable via a dropdown menu); address line 1; address line 2; city; state/province/region; zip code; phone number; first name of authorized signatory; last name of authorized signatory; and signature (for example, a digital signature or an upload of an image file). Accordingly, after each field is completed in both the client side and server side validation, a PDF document may be created and presented to the user to verify whether all the data is correct.

The engine 304 may receive the packing slip template 310 and information from the shipments database 316, enabling the engine 304 to communicate the aforementioned document and information to a PDF creator 318. The PDF creator 318 may be configured to convert the shipment data from the shipment database 316 and the packing slip template 310 to a viewable document, for example, a PDF. However, in various embodiments, the PDF creator 318 may convert the shipment data and packing slip template 310 into any viewable format, for example, a JPEG file, PNG file, TXT file, or other suitable format. In a further embodiment, the PDF creator 318 may be configured to convert the packing slip template 310 and shipment data into a "ready to send" e-mail. The PDF creator 318 may be equipped with an HTML-to-PDF converter, enabling the packing slip template populated by the user in HTML to be converted and saved as a PDF.

The PDF creator 318 may communicate the PDF version of the completed packing slip to file storage 320. The file storage 320 may store the completed packing slip, enabling the system to draw upon the file storage 320 for future shipments. For example, the system may utilize completed packing slips stored within the file storage 320 when compiling future packing slips having similar parameters (for example, the same seller or item).

Figure 4:
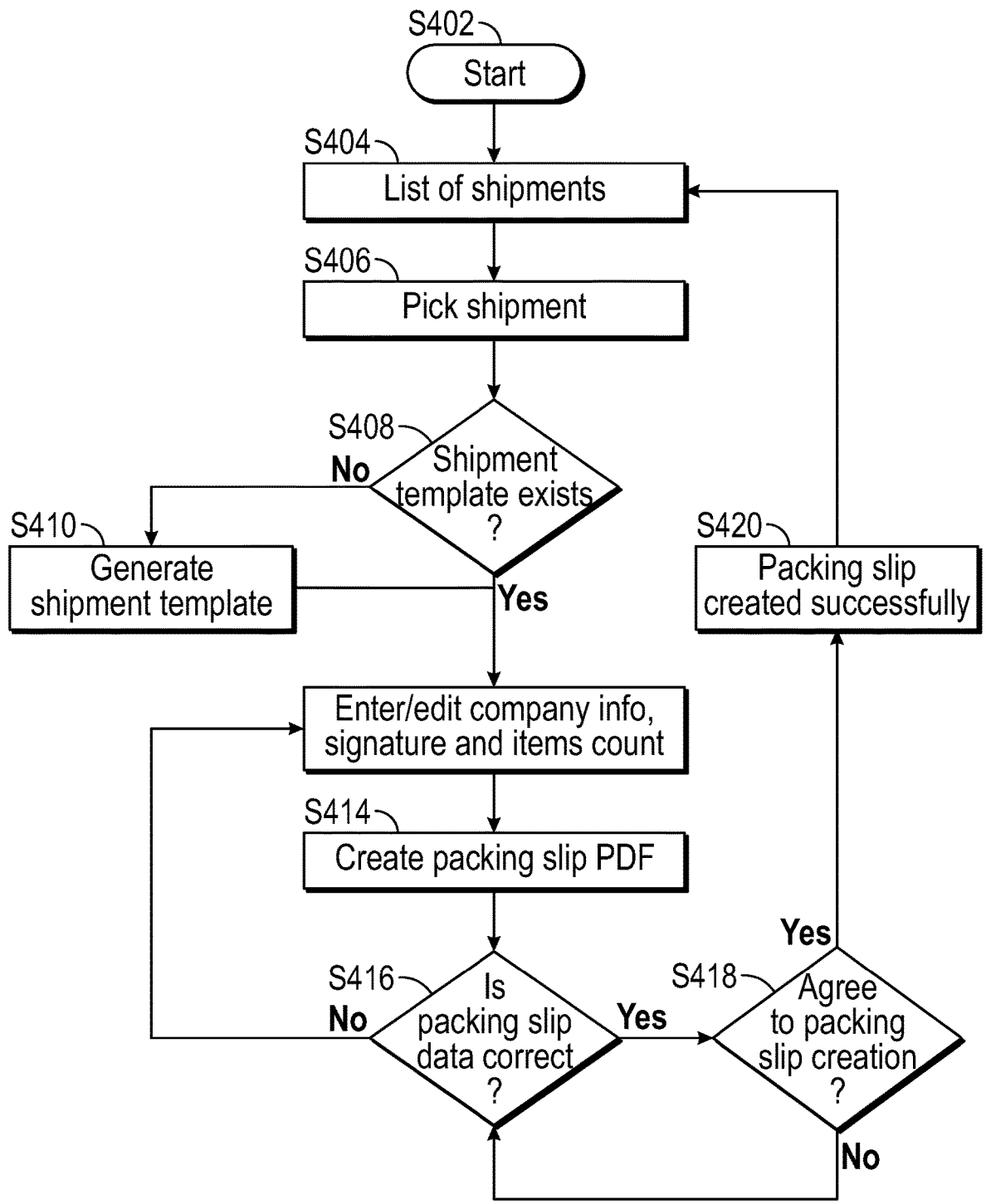
FIG. 4 is an illustration of a workflow of a packing slip generation method.

The system is described in greater detail below with regards to FIG. 4. FIG. 4 is a flow diagram illustrating operation of the packing slip creator method. As shown in FIG. 4, the method beings at step S402, where the user beings the packing slip creator method. Next, the method may call upon a list of shipments in step S404. The list of shipments in step S404 may include one or more shipments as derived from a third-party's backend or API. In step S406, the user may select one or more of the shipments (for example, the shipments populated in step S404).

In step S408, the packing slip creator system determines whether a shipment packing slip template exists. If a shipment packing slip template does not exist, in step S410, a shipment packing slip template may be generated. If a shipment packing slip template does exist, S410 may be bypassed, and the process continues to step S412. In step S412, the user may enter and/or edit company information, the signature, and/or item count. However, in step S412, the user may enter and/or edit any information relevant to the shipment.

In step S414, the packing slip PDF may be created, for example, based on the shipment template and/or edited information from step S412. In step S416 the user determines whether the packing slip data is correct. If the packing slip data is not correct, the process returns to step S412, where the user may enter and/or edit packing slip information. If in step S416 the packing slip data is correct, then in step S418 the user agrees or disagrees with the packing slip creation. If the user does not agree with the packing slip creation, then the process returns to step S416. If in step S418, the user does agree to the packing slip creation, then the process continues to step S420. In step S420, the process confirms that the packing slip has been successfully created. Accordingly, the created packing slip may be added to the list of shipments generated in step S404 or the created packing slip may be correlated to one or more of the shipments as displayed in step S404.

Referring to steps S416 and S418, a digital version of the PDF may be created before the user selects whether the packing slip is correct. Accordingly, the system may generate and display said completed packing slip as a digital PDF (for example, embedded in a web page). Such a digital PDF may be an accurate rendering of the PDF as it would appear as the final packing slip. Although such a digital PDF may be stored in any suitable database, for example, database 306 or file storage 320, the system may not require hard storage, as the digital PDF may be created via session variables. The digital PDF information may be stored in memory and displayed from memory, thus, no requirement to store such a digital PDF in a database. However, in step S420 the finalized version of the packing slip may be stored in file storage 320. The user may be prompted with the opportunity to download the PDF to a local hard disk, for example, the user's personal computer or smart device. Further, the user may be prompted with the opportunity to print the PDF to a receiving peripheral, such as a desktop printer or label printer. For the purposes of this disclosure, the "digital PDF" may refer to a PDF rendered within the program or browser, wherein the rendering is configured to mimic the appearance of the finalized PDF. Accordingly, the digital PDF enables the user to visualize an authentic and accurate preview of the packing slip.

After the PDF is finalized, the finalized PDF may be stored in file storage 320. However, the seller may download the PDF locally and utilize for internal business matters. Alternatively, the finalized PDF may be maintained by the system administrator and may be be utilized for case management, such as resolving issues with shipments or other claims.

The system may include a proprietary dashboard comprising one or more graphical user interfaces (GUI). Each of the GUIs may be configured to enable the user to make selections and enter information via their device and peripherals. Referring to FIG. 5, the system may include a shipment interface 500 configured to display the open shipments correlated to the user accessing said interface 500. Accordingly, shipment interface 500 may call upon the shipments database 316, extract the shipments connected to the user, and display these shipments on the interface 500. In such an embodiment, the shipments may be displayed along with the shipment expiration date. Each of the shipments displayed on the interface 500 may be selectable such that "clicking" a shipment may enable the user to create a packing slip for the selected shipment. Thus, selection of a shipment may cause the system to generate and display packing list interface 600.

Referring to FIG. 6, the system may include a packing slip interface 600. The packing slip interface 600 may include a plurality of prompts and a corresponding plurality of inputs. For example, the plurality of prompts may include "choose logo," company name, country, address, phone number, and/or any other suitable prompts. Further, the packing slip interface 600 may be configured to retrieve information from the shipments database 316 and display said shipment information on the packing slip interface 600. The packing slip interface 600 may also include a signature input. The signature input may be a digital signature pad, for example, an HTML, canvas. Accordingly, the user may trace their signature in the signature input via any suitable peripheral, for example, a mouse or trackpad. Further, if utilizing a touch-sensitive device, the user may trace their signature with their finger or a stylus. However, the signature input may be configured for image upload (for example, a JPG, PNG, or other suitable image file format). The packing slip interface 600 may further include a shipment item list, wherein the list includes identifying item information pertaining to the items within the shipment, for example, the FNSKU, SKU, Product Name, and/or Shipped Quantity. This information may be imported from the shipment database 316. Further, the packing slip interface 600 may include an edit function, wherein the user may edit the item information pertaining to the shipment. The edit function may enable the user to edit the item information such that the shipment item information is modified on the PDF but is not edited within the shipment database 316. However, in another embodiment edits to the PDF in the packing slip interface 600 may modify the data as it is stored within the shipment database 316. Upon completion of the packing slip interface 600, the user may select the "create packing list" button, causing the system to display the packing slip review interface 700.

The packing slip review interface 700 may be configured to display a digital PDF preview of the packing slip to the user. Said digital PDF preview may include the information as entered by the user in packing slip interface 600. For example, the signature and logo may be displayed on the packing slip review interface 700 as they will appear on the finalized packing slip. The packing slip review interface 700 may include an option to proceed and an option to edit. For example, these options may be represented by text buttons displaying "Yes, everything looks good," and "No, go back edit," respectively. If the user selects the option to proceed, the finalized PDF may be saved to the file storage 320. If the user selects the option to edit, the system may generate the packing slip interface 600, enabling the user to modify the previously entered information. In one embodiment, the option to edit may return the user to the packing slip interface 600, wherein the previously entered information is populated in the plurality of fields. In another embodiment, the option to edit may return the user to the packing slip interface 600, wherein the previously entered information is not populated in the plurality of fields.

In an embodiment, each PDF that is processed is stored. In one embodiment, the digital PDF preview is built by information temporarily stored in the server (for example, information entered in the packing slip interface 600). However, the PDF may be saved in the server with a temporary name and after a user selects the option to proceed, the temporarily stored PDF may be overwritten by the most recent version. Accordingly, if the user decides to edit the PDF, the previous PDF may also be replaced and overwritten.

The PDFs and the shipment information may be tagged such that said data and files correlate to the user. For example, the system may utilize the seller ID (for example, an ID assigned by a third-party selling platform). In such an example, all the information may be attached to this seller ID, enabling the system to retrieve any desired document or file from the various databases regarding that seller. In an embodiment, the various databases may include a seller ID column used to differentiate information by seller and enable the system to call on the databases to retrieve said seller-specific information.

The system and methods disclosed herein may be executed via a distributed network or a network of devices. In an embodiment, the client device may be configured to receive and/or process information derived from the user. Further, PDF creation and data recall from the APIs may be executed on any of the system's servers. Accordingly, intensive processing or file-heavy aspects may take place on the servers, whereas user input may be derived from the client device. However, any aspects, steps, procedures, or processes disclosed herein may be executable on server components or the client device.

In a further embodiment, peripherals of the client device may be utilized to receive user input. For example, the client device may comprise camera hardware configured to capture images of hardcopy packing slips or company letterhead. In such a non-limiting example, the system may derive information from the images captured by the camera hardware. Accordingly, the system may include an image-to-text or OCR aspect adapted to derive the desired information from the image. In a further embodiment, the client device may include a microphone configured to receive voice prompts from the user. Accordingly, information may be derived from such audio files. For example, data derived from audio may be sorted into the various inputs on the packing slip interfaces. In a further embodiment, processing of images or audio from the client device may be executed on one or more servers.

Finally, while certain novel features of the present invention have been shown and described, it will be understood that various omissions, substitutions and changes in the forms and details of the device illustrated and in its operation can be made by those skilled in the art without departing from the spirit of the invention.

What is claimed is:

1. A computer system for generating one or more packing slips in a remote computing environment comprising one or more processors, one or more computer-readable memories, one or more computer-readable storage devices, one or more displays, and program instructions stored on at least one of the one or more computer-readable storage devices for execution by at least one of the one or more processors via at least one of the one or more computer-readable memories, the stored program instructions comprising:
    presenting a shipment interface, via the one or more displays, comprising a list of shipments comprising one or more shipments,
        wherein each of the one or more shipments are selectable;
    receiving, via the shipment interface, a selected shipment from the list of shipments;
    determining, via the one or more processors, whether a shipment template exists for the selected shipment;
    recalling, via a DocMaster database, the shipment template if the shipment template exists for the selected shipment;
    generating, if the shipment template does not exist for the selected shipment, the shipment template;
    receiving, if the shipment template does exist for the selected shipment, a plurality of information;
    presenting a packing slip interface, via the one or more displays,
        wherein the packing slip interface is interactive such that a user may edit the shipment template, and
        wherein the packing slip interface is configured to receive additional information;
    creating, via the one or more processors, a packing slip Portable Document Format (PDF) based on the plurality of information, the selected shipment, the shipment template, and the additional information;
    presenting a packing slip review interface comprising a proceed option and an edit option,
        wherein the proceed option and the edit option are selectable;
    presenting the packing slip interface if the edit option is selected; and
    storing the packing slip PDF in a file storage if the proceed option is selected.

2. The computer system of claim 1, wherein the packing slip review interface comprises a rendered packing slip PDF, wherein the rendered packing slip PDF is rendered via session variables and is not permanently stored.

3. The computer system of claim 1, the stored program instructions further comprising:

recalling, from an Application Programming Interface (API), the one or more shipments; and processing, via the one or more processors and a shipment processing server, the one or more shipments.

4. The computer system of claim 1, wherein the packing slip interface comprises item information and an item information edit option configured to enable modification of the item information.

5. The computer system of claim 1, wherein the additional information comprises a signature input, wherein the signature input is an Hypertext Markup Language (HTML) canvas signature pad.

6. The computer system of claim 1, wherein the additional information comprises a logo upload configured to accept a logo, wherein the logo is an image file.

7. The computer system of claim 1, wherein selection of one of the one or more shipments from the shipment interface causes the one of the one or more shipments to be saved in the DocMaster database, and wherein a subsequent selection of the one of the one or more shipments causes the one of the one or more shipments to be recalled from the DocMaster database.

8. The computer system of claim 1, wherein the list of shipments includes one or more expiration dates, wherein each of the shipments of the list of shipments correlates to one of the one or more expirations dates, and wherein the list of shipments is sorted chronologically as a function of the one or more expiration dates.

\* \* \* \* \*